UNITED STATES PATENT OFFICE.

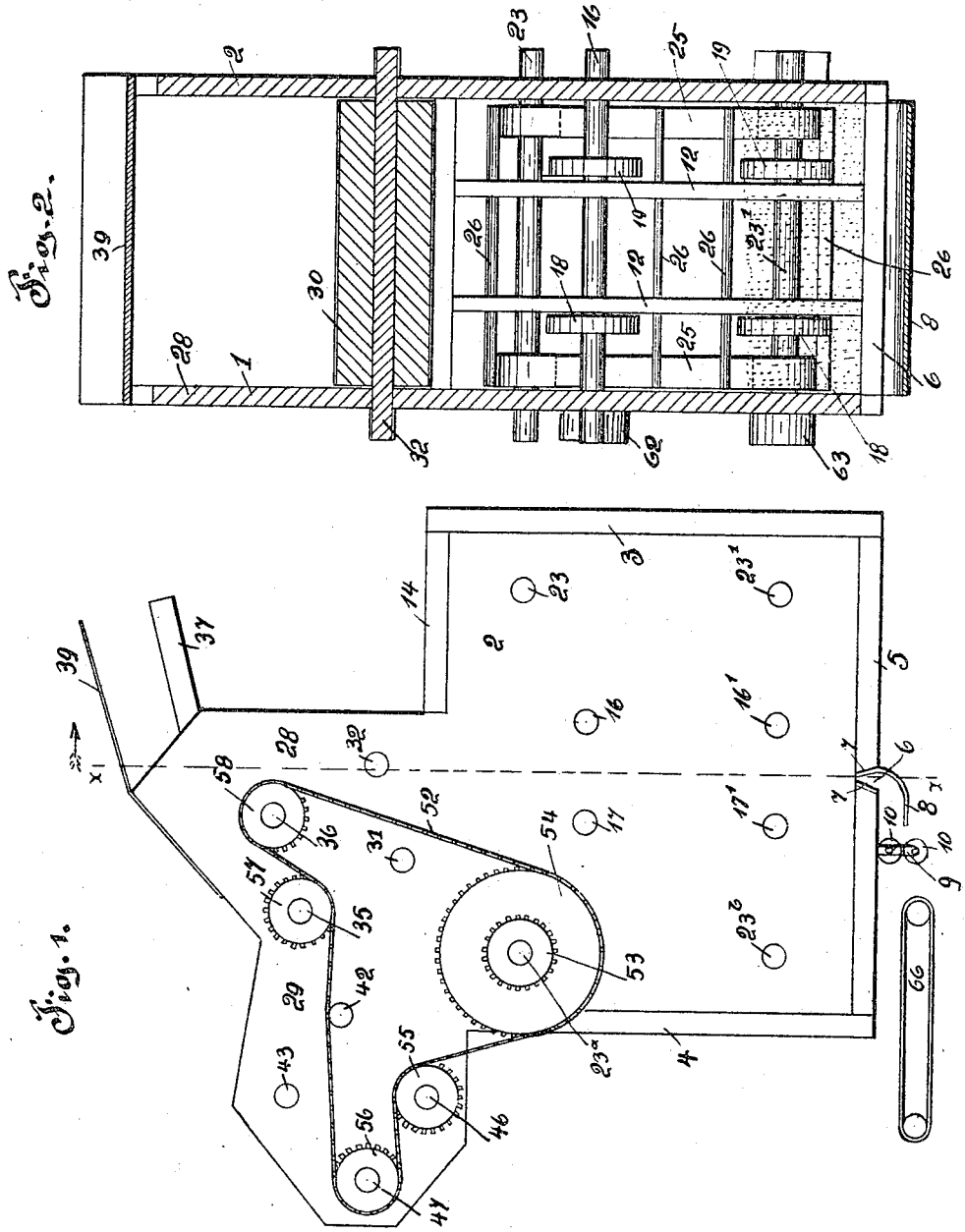

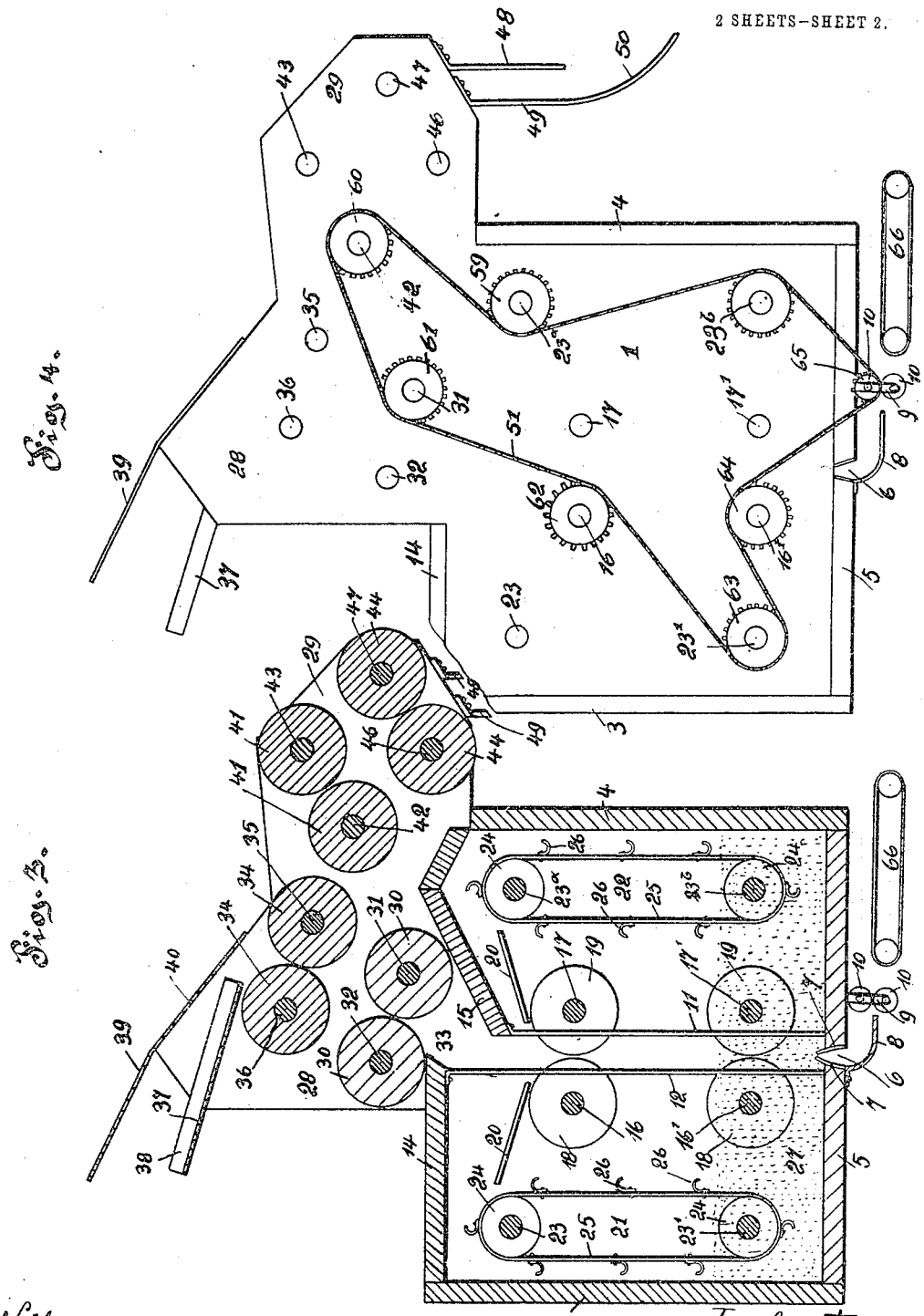

LOUIS G. HILL, OF MONESSEN, PENNSYLVANIA.

MACHINE FOR CLEANING PLATES.

No. 807,929. Specification of Letters Patent. Patented Dec. 19, 1905.

Application filed April 22, 1905. Serial No. 256,928.

*To all whom it may concern:*

Be it known that I, LOUIS G. HILL, a citizen of the United States of America, residing at Monessen, in the county of Westmoreland and State of Pennsylvania, have invented certain new and useful Improvements in Machines for Cleaning Plates, of which the following is a specification, reference being had therein to the accompanying drawings.

This invention relates to certain new and useful improvements in machines for cleaning plates, and more particularly to a machine employed for cleaning and polishing tin plates.

The object of the invention is to provide a novel form of machine into which plates can be fed, said plates being treated with an abrading material and then passed through suitable polishing-rolls, the plates being finally ejected from the machine as a finished product.

The invention aims to provide novel and effective means for removing stains, irregularities, and foreign ingredients from the surfaces of a plate, particularly a plate of tin. I have devised a novel machine the movable parts of which are constructed in a compact form and suitably incased. The machine is adapted to be used in tin-mills for cleansing plates prior to being packed for commercial purposes.

My improved machine is extremely simple in construction, strong and durable, comparatively inexpensive to manufacture, and highly efficient for the purposes for which it is used.

The invention finally consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 1 is a side elevation of my improved machine. Fig. 2 is a vertical transverse sectional view taken on the line *x x* of Fig. 1. Fig. 3 is a vertical longitudinal sectional view of my improved machine, and Fig. 4 is a side elevation view of the opposite side of the machine from that shown in Fig. 1 of the drawings.

To put my invention into practice, I employ a casing consisting of side walls 1 and 2, end walls 3 and 4, and a bottom or base 5. The bottom or base 5 is provided with a transversely-disposed slot 6, carrying shields 7 7. Upon one side of the slot 6 and attached to the base 5 is a curved guide-plate 8. Attached to the base 5 adjacent to the edge of the plate 8 are hangers 9 9, in which are journaled rolls 10 10. Arranged vertically within the casing upon each side of the transversely-disposed slots 6 are guide-strips 11 and 12, two strips being preferably arranged upon each side of the slot 6. The upper ends of the strips 12 support the top plate 14, while the upper ends of the guide-strips 11 support the angularly-disposed plate 15, mounted between the side walls 1 and 2 of my improved machine.

Journaled within the side walls 1 and 2 and transversely arranged therein one above the other in close proximity to the guide-strips 11 and 12 are shafts 16 16' and 17 17', carrying wheels 18 18 and 19 19, respectively. Mounted transversely of the casing directly above each set of the uppermost wheels 18 and 19 are deflector-plates 20 20.

Mounted in the side walls 1 and 2 of the machine between the end walls 3 and 4 and the wheels 18 and 19 are conveyers 21 and 22, the conveyers consisting of revoluble shafts 23, 23', 23$^a$, and 23$^b$, journaled in the side walls 1 and 2 and disposed one above the other. These shafts carry pulleys 24 24, over which travels an endless belt 25, carrying strips 26 of a substantial cup shape. In Fig. 2 of the drawings it will be observed that these strips are arranged upon the endless belts 25, whereby they will extend transversely of the machine. In the bottom of the casing is adapted to be placed a suitable abrading material 27, such as sawdust, salt, or the like cleansing ingredient.

The side walls 1 and 2 are formed with upwardly-extending portions 28 28 and outwardly-extending wings 29 29. Between the upwardly-extending portions 28 and the wings 29 are journaled a plurality of rolls, some of said rolls serving functionally as guide-rolls, while others are adapted to polish material passing between said rolls. The rolls 30 30 are mounted upon shafts 31 and 32, journaled in the upwardly-extending portions 28 28 of the side walls. These rolls serve as guide-rolls and are arranged above the opening 33, existing between the inner edge of the top 14 and the edge of the angularly-disposed plate 15. Mounted above the rolls 30 30 and a little to one side are rolls 34 34, mounted upon shafts 35 and 36, journaled between the upwardly-extending portions 28 28 of the side walls. Carried between the upwardly-extending portions 28 28 of the side walls and disposed at an angle above the roll journaled upon the shaft 36 is a shifting plate 37, having flanged sides 38. A shield-plate 39 is secured to the angular top edges 40 40 of the upwardly-extending portions 28 28 of the side walls. The rolls 34 34 serve as guide-rolls, as will be presently described.

The outwardly-extending wings 29 29 support the polishing-rolls, and the sets of rolls 41 41 are mounted upon shafts 42 and 43, journaled in the upwardly-extending wings of the side walls. These rolls are disposed substantially at a right angle to the rolls 34 34. Rolls 44 44 are mounted upon shafts 46 and 47, journaled in the lower sides of the wings of the side walls. These rolls are disposed at an angle to the rolls 41 41. The lower edges of the wings 29 29 of the side walls are provided with transversely-arranged depending plates 48 and 49, the plate 48 serving as a shield, while the plate 49 serves as a guide and has its lower end bent outwardly, as indicated at 50.

To operate my improved machine, I connect the shafts of the various rolls together by continuous chains, a chain 51 being employed upon one side of the machine and a chain 52 upon the opposite side. The shaft 23ª of the conveyer 22 serves as a power-shaft, and this shaft upon one side of the machine is provided with sprocket-wheels 53 54. The sprocket-wheel 53 is adapted to receive power from a suitable source of energy, and the shaft may be coupled direct to a suitable motor, if it be so desired. The chain 52 passes over the sprocket-wheel 54, sprocket-wheels 55 and 56, carried by the shafts 47 and 46, under a sprocket-wheel 57, carried by the shaft 35, and over a sprocket-wheel 58, carried by the shaft 36, imparting motion to the polishing-rolls 44 44 and the uppermost set of guide-rolls 34 34. Upon the opposite side of the machine the chain 51 passes over a sprocket-wheel 59, carried upon the opposite end of the power-shaft 23ª. This chain also passes over a sprocket-wheel 60, carried by the shaft 42, and a sprocket-wheel 61, carried by the shaft 31, under a sprocket-wheel 62, carried by the shaft 16, over a sprocket-wheel 63, carried by the shaft 23', and over a sprocket-wheel 64, carried by the shaft 16'. The chain 51 passes over a sprocket-wheel 65, carried by one of the shafts upon which one of the rolls 10 is mounted. In operation I employ as an indispensable adjunct to my machine a conveyer 66, mounted beneath my improved machine. This conveyer is common to numerous types of machines and is employed for conveying plates to machines. When my improved machine is in operation, the plates to be treated therein pass through the rolls 10 10 and are forced upwardly into the machine through the slot 6. The upper edges of the plates are gripped between the wheels 18 and 19 and carried upwardly between the guide-strips 11 and 12, the upper edge of the plates being again gripped between the wheels 18 and 19 and forced upwardly through the opening 33 until they are engaged by the guide-rolls 30 30. During the passage of the plates between the wheels 18 and 19 and the rolls 30 30 the plates are treated with abrading material, such as sawdust. The abrading material 27, carried in the bottom of the machine, is elevated by the endless conveyers 21 and 22 and thrown over the deflector-plates 20 20 into engagement with both sides of the plates.

The plates pass upwardly between the guide-rolls 30 and 34 until they strike the plate 40, at which time they are forced outwardly upon the shifting plate 37. Simultaneous with the release of the lower edge of the plates from the guide-rolls 34 34 the plates drop upon the shifting plate and travel back over the guide-rolls 34 34, which transfers the plates to the polishing-rolls 41 41. The plates travel through these rolls and pass into the rollers 44 44, finally being deposited between the plates 48 and 49, from where they pass out of the machine onto a suitable conveyer or into a suitable receptacle.

It will be observed from the foregoing description that each and every plate passing through my improved machine is first treated to remove the stains and irregularities that may appear upon the surfaces of the plates and is then passed through suitable rolls adapted to polish the plates. While I have herein described the preferred manner of constructing my improved machine, it is obvious that other means than the conveyers 21 22 can be employed for projecting the abrading material against the sides of the plates, and I do not care to confine myself to the particular polishing material from which the polishing-rolls may be formed.

It will be noted that various changes may be made in the details of construction without departing from the general spirit and scope of the invention.

What I claim, and desire to secure by Letters Patent, is—

1. In a machine of the type described, the combination with a casing, upwardly-extending portions carried by the sides of said casing, outwardly-extending wings carried by said upwardly-extending portions, the bottom of said casing having an opening formed therein, vertically-disposed guide-strips mounted in said casing, revoluble wheels mounted adjacent to said strips, conveyers mounted in each end of said casing, guide-rolls journaled between said upwardly-extending portions, a shifting plate mounted above said guide-rolls, polishing-rolls journaled between said outwardly-extending wings, and means to simultaneously operate said conveyers, said wheels and said rolls, substantially as described.

2. In a machine of the type described, the combination of a casing, the bottom of said casing having an opening formed therein, vertically-disposed wheels mounted above said opening, conveyers mounted in each end of said casing, and adapted to convey a suitable abrading material, guide-rolls mounted above said wheels, a shifting plate mounted above said rolls, polishing-rolls mounted above said casing, and means to simultaneously operate said conveyers and revolve said wheels and said rolls, substantially as described.

3. In a machine for cleansing and polishing tin plates, the combination with a casing adapted to contain abrading material, of wheels mounted within said casing and adapted to move a plate through said machine, means to elevate said abrading material and project said abrading material against plates passing through said machine, and means to polish said plates, substantially as described.

4. In a machine for cleansing and polishing tin plates, the combination with a suitable casing having an opening formed therein, of means to feed plates into said casing, means to carry plates through said casing, means to project a suitable abrading material against the sides of said plates during their passage through said casing and means to polish said plates prior to their ejection from said machine, substantially as described.

In testimony whereof I affix my signature in the presence of two witnesses.

LOUIS G. HILL.

Witnesses:
ERNEST C. KEARNS,
JOHN W. NETH.